United States Patent [19]

Sloin

[11] 4,383,764
[45] May 17, 1983

[54] APPARATUS FOR CONTINUOUS EXTRUSION WITHOUT REVERSE FLOW OF MATERIAL

[76] Inventor: Leon Sloin, 1900 S. Ocean Blvd., No. 9L, Pompano Beach, Fla. 33062

[21] Appl. No.: 262,897

[22] Filed: May 12, 1981

[51] Int. Cl.³ .............................................. B43K 21/08
[52] U.S. Cl. ........................................ 366/75; 366/76; 366/77; 366/88; 366/89
[58] Field of Search .................. 36/75, 76, 77, 78, 88, 36/89, 90, 79, 286, 333, 147, 149; 425/190, 192 R, 203, 208; 264/102

[56] References Cited

U.S. PATENT DOCUMENTS

| | | | |
|---|---|---|---|
| 687,915 | 12/1901 | Chambers, Jr. | |
| 2,537,395 | 1/1951 | Brown | |
| 3,025,565 | 3/1962 | Doriat et al. | 264/102 |
| 3,109,196 | 11/1963 | Schmidt | 425/190 |
| 3,451,462 | 6/1969 | Szabo et al. | |
| 3,712,594 | 1/1973 | Schippers | 425/408 X |
| 3,728,053 | 4/1973 | Stillhard et al. | |
| 3,737,150 | 6/1973 | Otake | 366/90 X |
| 3,797,550 | 3/1974 | Latinen | |
| 3,924,997 | 12/1975 | Kosinsky | |
| 4,049,244 | 9/1977 | Hedrich | 366/143 |
| 4,117,583 | 10/1978 | Gnadig | 425/408 X |
| 4,124,307 | 11/1978 | Anisic | 366/149 X |
| 4,167,339 | 9/1979 | Anders | 369/79 |

Primary Examiner—Billy J. Wilhite
Assistant Examiner—Arthur D. Dahlberg
Attorney, Agent, or Firm—Finnegan, Henderson, Farabow, Garrett & Dunner

[57] ABSTRACT

An apparatus for continuous extrusion of a material including a hollow barrel with inner liner having a cylindrical chamber portion and an outwardly divergent, coaxial frusto-conical outlet chamber portion adjacent thereto so that reverse pressure developed by extrusion of the material results in sealing engagement of the frusto-conical screw and barrel portions thereby effectively preventing regurgitation of the material. A fluted screw is rotatably positioned coaxially within the barrel and liner, and has both cylindrical and outwardly divergent outer thread surface portions conforming to the inner surface of the cylindrical and the frusto-conical chamber portions, respectively, of the barrel and liner. Rotation of the screw forces the material to flow axially through the barrel along the threads of the screw toward the outlet chamber portion and through an extrusion die. Resistance of the die to the flow of material results in a force in the reverse direction being exerted on the threads of the frusto-conical chamber portion establishing an effective, fluid-tight seal to prevent reverse flow or regurgitation of the material between the screw and the barrel liner.

14 Claims, 4 Drawing Figures

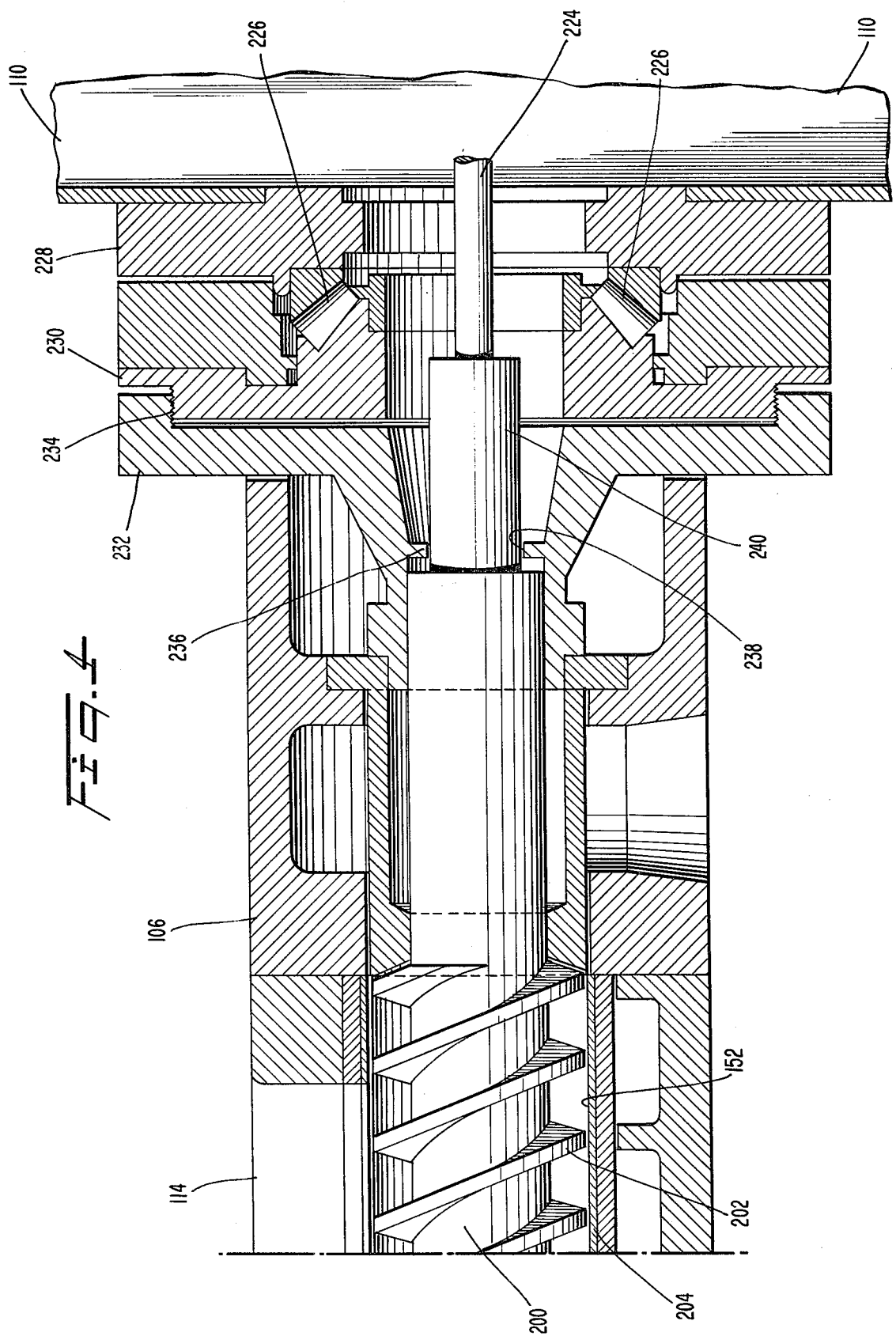

APPARATUS FOR CONTINUOUS EXTRUSION WITHOUT REVERSE FLOW OF MATERIAL

BACKGROUND OF THE INVENTION

1. Field of the Invention

The present invention relates generally to devices for extrusion, and in particular, to a device for continuous extrusion without reverse flow of compounded rubber during which impurities are removed by a vacuum removal process.

2. Description of the Prior Art

Prior art devices for extruding material, especially rubber, include various cylindrical and conical helix screw feed mechanisms for moving the material through a barrel and liner. Many of these extrusion devices include means for drawing off impurities during processing, such as by vacuum. A problem typical of cylindrical helix- or screw-type extrusion devices is that the material head pressure may become so great that the rubber is forced in a direction opposite the desired direction of flow. The resulting regurgitation or reverse flow is especially troublesome in both vacuum and non-vacuum type extruders, since the rubber may be eventually forced back into either the vacuum or the feed section of the device, thereby causing the vacuum port and feed section mechanisms to become obstructed. When this occurs, the equipment must be shut down with concomitant lost production time and increased costs.

To compound this problem, the outer edges of the fluted screw helix as well as the walls of the barrel liner in cylindrical-type prior art devices tend to become badly worn in time, further increasing the possibility of unwanted regurgitation or reverse flow. Thus, frequent replacement of worn barrel, liner and screw members is required to insure against regurgitation resulting in increased and costly delays in production and overall operational inefficiency. In addition, conventional cylindrical screw devices require a screw of substantial length having many threads in order to minimize the chance of regurgitation.

SUMMARY OF THE INVENTION

An object of the present invention, therefore, is to construct a device for continuously extruding material which permits high extrusion head pressure to be maintained without reverse flow or regurgitation of the material back through and between the screw and barrel liner.

It is another object of this invention to construct a device for continously extruding material in which a sealing engagement is effectively provided and maintained between the outer surface of the screw threads and the barrel chamber and liner even after the screw threads have become worn.

A further object of the present invention is to construct a device for continuous extrusion of material permitting convenient adjustment and replacement of parts without major removal of screw, extrusion die head and/or barrel and liner assemblies.

The present invention exhibits several significant advantages over prior art extruders in that reverse flow or regurgitation of material is prevented, fouling or obstruction of vacuum ports and/or inlet mechanisms is avoided and equipment down time is reduced as well as reductions in maintenance procedures and costs.

Further objects of the present invention will become apparent in the full description of the invention and drawings as set forth below.

The present invention is summarized in that an apparatus for continuous extrusion of a material under vacuum without reverse flow of material includes a hollow barrel and liner having a cylindrical chamber portion and a coaxial frusto-conical chamber portion diverging outwardly from the cylindrical chamber portion, and a threaded screw rotatably positioned coaxially in the hollow barrel and liner, the screw threads defining a cylindrical outer surface conforming to the inner surface of the cylindrical chamber liner and a tapered outer surface conforming to the inner surface of the frusto-conical chamber portion. The material is fed via feeding means into the hollow barrel and liner and forced by rotation of the screw to flow axially through the barrel and liner in a forward direction toward an outlet end of the barrel, with vacuum means being provided for removing volatiles and impurities separated from the material during its flow toward the outlet end. The material is then extruded from the outlet and under high head pressure. The tapered outer surface of the screw is continuously forced against the inner surface of the frusto-conical portion of the screw in a direction opposite to the forward flow of the material, thereby ensuring a tight seal between the screw and the barrel and liner, and preventing unwanted reverse flow of material.

BRIEF DESCRIPTION OF THE DRAWINGS

FIG. 4 is a perspective view of the apparatus of FIG. 1 with the drive mechanism shown partially in section.

DESCRIPTION OF THE PREFERRED EMBODIMENTS

Figure 1:
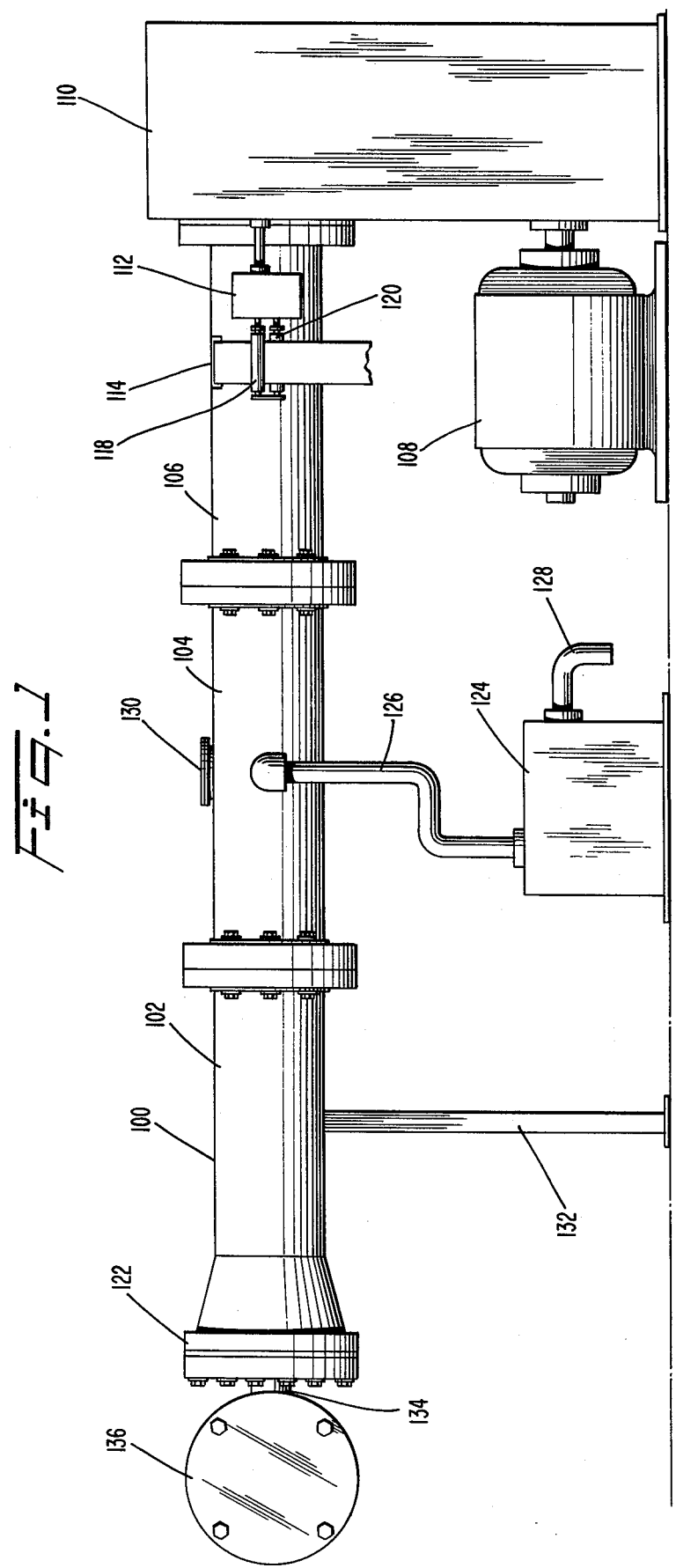
FIG. 1 is a side view of a preferred embodiment of an apparatus for continuous extrusion of material under vacuum without reverse flow in accordance with the present invention.

A preferred embodiment of an apparatus for continuous extrusion of material under vacuum without reverse flow is shown in FIG. 1 in side view. The apparatus comprises a hollow barrel 100 with a rotatable screw (not shown) positioned coaxially therein and extending the full length of the barrel. According to a preferred embodiment, the barrel 100 consists of three individual sections 102, 104 and 106 coupled together end to end. Alternatively, the barrel 100 may be formed by a single continuous piece or any desired number of individual sections.

Sections 104 and 106, and most of section 102 are of cylindrical shape, thus generally lending an overall cylindrical shape to barrel 100. The outlet end 122 of barrel section 102, however, has a frusto-conical shape of a diameter progressively increasing towards the outlet end. The particular nature and function of this frusto-conical shape will be explained in more detail, hereinbelow, with regard to the function of the inner rotatable screw.

The rotating screw inside barrel 100 is driven by a motor 108 coupled through a gear box 110 positioned at the end of barrel section 106. Section 106 of the barrel is provided with an inlet port 114 into which a material 116 to be extruded, for example, rubber, may be fed by any suitable means, such as rollers 118 and 120 drivingly coupled to gear box 110 and motor 108 through a roller drive mechanism 112.

Material 116 is moved along the interior of barrel 100 from the inlet port 114 towards the outlet end 122 upon rotation of the inner screw which has threads that engage and carry said material. As the material progresses through the barrel, impurities and volatiles are forced out and removed under vacuum generated by a vacuum motor 124 coupled to barrel 100 through a hollow pipe 126. The impurities and volatiles removed in this manner are expelled from the extrusion apparatus via an exhaust pipe 128.

A viewing port 130 is also provided in barrel 100 adjacent the juncture of vacuum pipe 126 to permit visual inspection of material 116 as it progresses through the barrel under action of the inner screw.

Material 116 introduced into the barrel at inlet port 114 travels the length of the barrel by the action of the inner rotating screw, finally reaching the frusto-conically shaped outlet end 122 of barrel section 102 which is provided with a support member 132. At the outlet end 122, material 116 is extruded through a narrowed throat section 134 containing an extrusion die (not shown) and ultimately into a cross-head 136. Thus, material 116 has progressed from its raw state as introduced at inlet port 114 into an extruded state in a form dictated by the extrusion die located in throat 134, during which all impurities and volatiles are removed from the extruded material by vacuum means 124, 126 and 128.

The specific details of the inner screw and the operation of the extrusion apparatus will now be explained with reference to FIGS. 2-4 in which the reference characters correspond to those discussed hereinabove with respect to FIG. 1.

Figure 2:
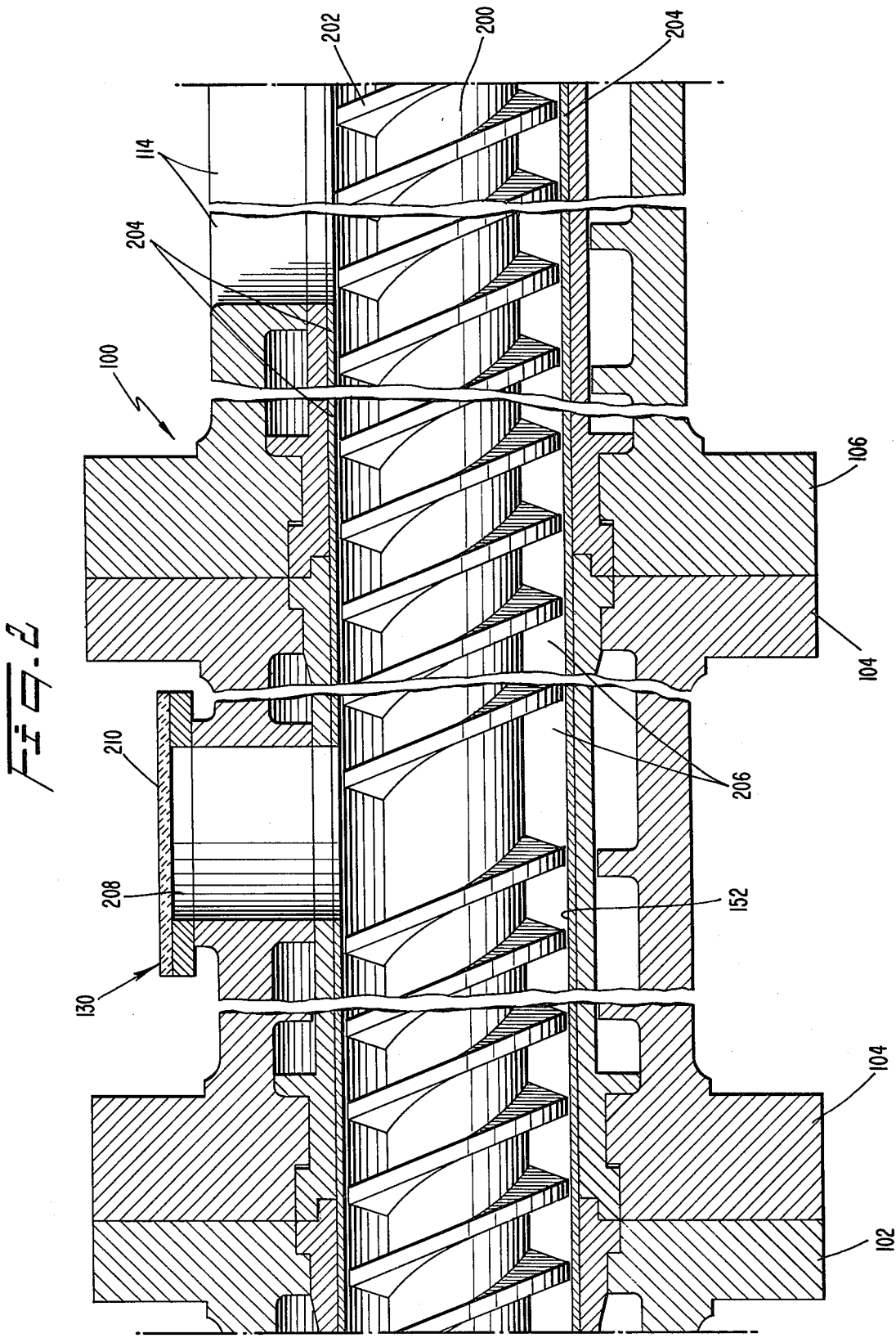
FIG. 2 is a perspective view of the apparatus of FIG. 1 with the cylindrical chamber and inlet port shown partially in section.
Figure 3:
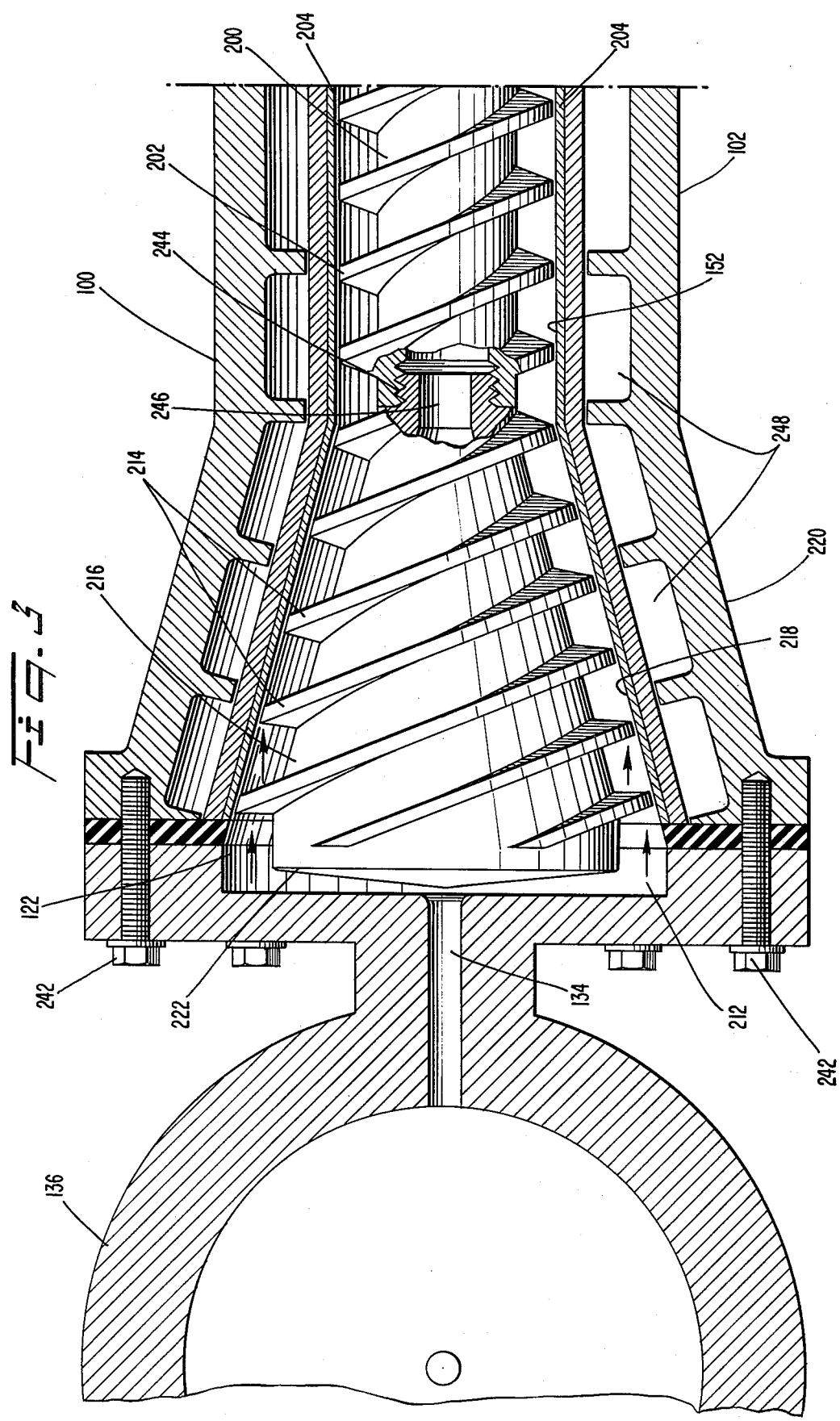
FIG. 3 is a perspective view of the apparatus of FIG. 1 with the frusto-conical chamber shown partially in section.

Referring to FIG. 2, the material 116 to be extruded is introduced into the interior of barrel 100 at inlet port 114 of barrel section 106. At this site, it is engaged by screw 200 rotating coaxially within the barrel and is therefore cut into strips by the threads 202 of screw 200. Upon continued rotation of screw 200, the cut material 116 is forced into the interior of barrel 100 towards the outlet end by the urging of threads 202.

To ensure proper movement of material 116 through barrel 100, the shape and dimension of the outer edges of threads 202 must generally conform to the inner diameter of barrel 100. In addition, a liner 204 is provided throughout the inner circumference of barrel 100 so that screw 200 does not bear directly on the barrel's interior walls. Liner 204 is replaceable since it is subject to wear as the extrusion apparatus is operated and screw 200 rotates.

As material 116 progresses through section 106 of barrel 100 onwards to section 104 by the rotation of screw 200 and threads 202, said threads continuously cut and pulverize the material. This process causes separation of impurities and volatiles from the material, although such foreign particles continue to be carried with the material by the urging of threads 202. Ultimately, material 116 and the separated impurities together reach a cleansing area 206 which is proximate the viewing port 130 and the outlet for vacuum pipe 126 (not shown).

A portion of threads 202 of screw 200 are spaced farther apart from one another in the region of cleansing area 206. This wider spacing causes material 116 passing thereover to be stretched thinner than usual, thus exposing the separated impurities and volatiles which can be neatly removed by vacuum through hollow pipe 126 (not shown). The material 116 cleansed of impurities and volatiles is then carried further down barrel 100 into section 102 by threads 202 of rotating screw 200.

Viewing port 130 is located in cleansing area 206 to allow visual inspection of the cleansing process described above. According to a preferred embodiment, the port consists of an opening 208 provided in the barrel 100 and liner 204 and is covered by a plate of transparent material 210 such as bulletproof glass, plastic or any other suitable material capable of withstanding the vacuum existing in the region of cleansing area 206.

The progression of the material 116 from barrel section 104 into section 102 and through the outlet end 122 into the extrusion head 136 will now be explained with reference to FIG. 3. Ultimately, material 116 will be carried to outlet end 122 by the action of threads 202 of the rotating screw 200 and will be forced to exit the interior of barrel 100 into an extrusion die (not shown) located within throat 134 provided at the outlet end 122. Because of the difference in size between the relatively large interior diameter of the barrel and the narrower extrusion die throat 134, substantial pressure is produced at outlet end 122 opposing the extrusion of material 166 into the extrusion throat 134. This pressure is exerted as a force opposite to the normal direction of progression of material 116 as indicated by force arrows 212.

In an extrusion apparatus of conventional cylindrical design, these opposite-direction forces are often sufficiently strong to cause regurgitation or reverse flow of the material being extruded back over the threads of the driving screw and away from the outlet end. The present invention instead incorporates a barrel 100 and screw 200 having a frusto-conical shape proximate outlet end 122 with a diameter of increasing dimension towards outlet end 122. In this manner, the opposite-direction forces produced by the extrusion of material 116 into throat 134 press the outer surfaces of threads 214 of the frusto-conical screw portion 216 against the liner 218 and inner walls of the frusto-conical barrel protion 220. This sealed contact between threads 214 of the frusto-conical screw portion 216 and the liner 218 of the frusto-conical shaped barrel portion 220 effectively prevents regurgitation and reverse flow of material 116 back into the cylindrical portion of barrel 100. Moreover, due to the tapered shape of frusto-conical barrel 220 relative to screw 216, any increase in the back pressure developed by the extrusion of material 116 results in an increase in sealing engagement between screw threads 214 and barrel portion 220 so as to always prevent regurgitation from occurring in the apparatus.

Accordingly, the material 116 is forced by the action of screw 200 within the barrel 100 past the screw and cap 222 into the extrusion throat 134 and subsequently into cross-head piece 136.

Since continued engagement of threads 214 of the frusto-conical screw portion 216 against liner 218 will eventually cause wear of both parts, means for adjusting the position of the screw within the barrel are provided as shown in FIG. 4. As set forth above, the screw 200 is drivingly engaged to gear box 110 by means of a shaft 224 which is supported by a thrust bearing 226 provided in a retainer 228. Adjacent thrust bearing 226 are a pair of adjusting members 230 and 232 which are threaded together along microthreads 234. Rotation of adjusting member 230 causes axial movement of adjusting member 232 which is translated into corresponding axial movement of screw 200 due to engagement of a lip 236 of adjusting member 232 with a groove 238 located in the circumference of a shaft 240 coupled between shaft 224 and screw 200. By manipulation of adjusting members 230 and 232, therefore, movement of screw 200 can be effected to compensate for wear to liner 218 and threads 214 of the frusto-conical portions.

Further wear of the screw threads and liner of the frusto-conical portions may necessitate total replacement of these frusto-conical portions of the screw and/or liner. Referring again to FIG. 3, such operations can be readily accomplished upon removal of the extrusion cross-head 136 from the outlet end 122 of the barrel. In a preferred embodiment, this is done by removing connecting bolts 242 and separating the two pieces; alternatively, other connecting means may be used to readily separate these pieces such as a hinge or flange for rotating the cross-head away from the outlet end of the barrel.

Once the cross-head 136 has been moved out of position exposing the frusto-conical portion 216 of the screw, said screw portion is readily detachable from the cylindrical portion of screw 200 by unscrewing the two portions along mating threads 244 located in the interior of the screw at the junction of said frusto-conical portion 216 and said cylindrical portion 200. A new frusto-conical screw portion or liner, or both, may then be installed as is necessary, and the cross-end apparatus 136 then repositioned and fixed onto output end 122 to resume the extrusion operation. This entire operation is easily performed, thus minimizing apparatus down time and concomitant serving costs.

The present invention also has means for providing a coolant within both screw 200 and barrel 100. Referring to FIG. 3, this is accomplished in the former case by means of a hollow channel 246 located through the interior of the screw 200 and in which a cooling fluid can be circulated. As to cooling of the barrel, a plurality of channels 248 are provided in the walls of said barrel covered by the liner 204 thereby providing a liquidtight jacket for containing a coolant.

It can be appreciated from the foregoing that the present invention provides continuous extrusion of material under a vacuum for removing impurities and other volatiles, and without regurgitation or reverse flow of said material. The unique shape of the frusto-conical screw and corresponding barrel portion utilizes the opposite-direction forces developed by the extrusion of the material to create sealed contact between the threads of the inner rotating screw and the liner of the barrel, thus effectively preventing regurgitation of the material. Adjusting means are provided to axially shift the screw relative the barrel to compensate for wear to the frusto-conical screw threads and the barrel liner, whereas further means are provided to facilitate easy removal and replacement of the frusto-conical screw portion and/or liner if so required.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. An apparatus for continuous extrusion of a material without reverse flow of material, comprising:
   a hollow barrel having a cylindrical chamber portion and a frusto-conical chamber portion diverging outwardly from said cylindrical chamber portion;
   a threaded screw rotatably positioned coaxially within said hollow barrel, said screw having a threaded cylindrical screw portion located within said cylindrical chamber portion and a threaded frusto-conical portion located within said frusto-conical chamber portion diverging from said cylindrical screw portion, said screw threads defining a cylindrical outer surface conforming to the inner surface of said cylindrical chamber portion and a tapered outer surface conforming to the inner surface of said frusto-conical chamber portion;
   inlet means for feeding the material into said hollow barrel;
   driving means coupled to said screw for rotating said screw within said barrel so as to force the material to flow axially through said barrel in a forward direction toward an outlet end of said barrel adjacent said frusto-conical chamber portion opposite said cylindrical chamber portion;
   outlet means connected to said outlet end of said barrel for expelling the material accompanied by a reverse pressure resulting from the resistance of said outlet means to said forward flow of the material,
   said tapered outer surface of said screw cooperating with said inner surface of said frusto-conical chamber portion and forming a seal in response to said reverse pressure exerting a force on said threads of said frusto-conical portion in a direction opposite to said forward flow of the material, whereby reverse flow of the material between said screw and barrel in said opposite direction is prevented; and
   adjusting means coupled to said screw for axially displacing said screw by a predetermined amount thereby controlling the contact between said tapered outer surface of said screw and said inner surface of said frusto-conical chamber portion.

2. An apparatus as recited in claim 1, further comprising vacuum means coupled to said barrel for removing impurities separated from the material during said forward flow of the material through said barrel.

3. An apparatus as recited in claim 2 further comprising a viewing port provided in said barrel adjacent said vacuum means for visually inspecting said screw and the material flowing through said barrel.

4. An apparatus as recited in claim 3 wherein said threads of said screw have a pitch which is increased in a region proximate said viewing port, whereby flowing of the material through said region and over said threads of increased pitch causes said impurities to be separated from the material.

5. An apparatus as recited in claim 1, wherein said inlet means comprises an inlet port provided in said cylindrical chamber portion of said barrel and means driven by said driving means for feeding the material through said inlet port into said barrel.

6. An apparatus as defined in claim 1, further comprising a replaceable liner provided on the interior surface of said hollow barrel.

7. An apparatus as recited in claim 6, wherein said frusto-conical portion of said screw is detachable from said cylindrical portion of said screw.

8. An apparatus as recited in claim 7, wherein said outlet means comprises an extrusion head removably connected to said outlet end of said barrel for providing ready access to said detachable frusto-conical screw portion and said replaceable liner.

9. An apparatus as reicted in claim 6 further comprising a liquid coolant provided between said liner and said interior surface of said barrel, thereby cooling said barrel.

10. An apparatus as recited in claim 6 wherein a portion of said replaceable liner located on the interior surface of said frusto-conical chamber portion is removable separately from a portion of said replaceable liner located on the interior surface of said cylindrical chamber portion.

11. An apparatus as recited in claim 1 wherein said screw includes an interior passage and a fluid provided in said passage for cooling of said screw.

12. An apparatus as recited in claim 1 wherein said adjusting means includes a first adjusting member coaxially positioned about said screw.

13. An apparatus as recited in claim 12 wherein said adjusting means further includes a second adjusting member coaxially positioned about said screw and having a surface provided with a plurality of threads for engaging a corresponding plurality of threads provided on a surface of said first adjusting member, whereby rotation of said first and second adjusting means relative each other effects axial displacement of said screw.

14. An apparatus as recited in claim 13 wherein said screw is provided with a circumferential groove engaging a corresponding lip portion of said first adjusting member for translating rotational movement of said first and second adjusting members into axial displacement of said screw.

* * * * *